May 27, 1947.                B. HASKINS                 2,421,060
                              TABULATOR
                        Filed March 27, 1943          3 Sheets-Sheet 1
FIG. 1
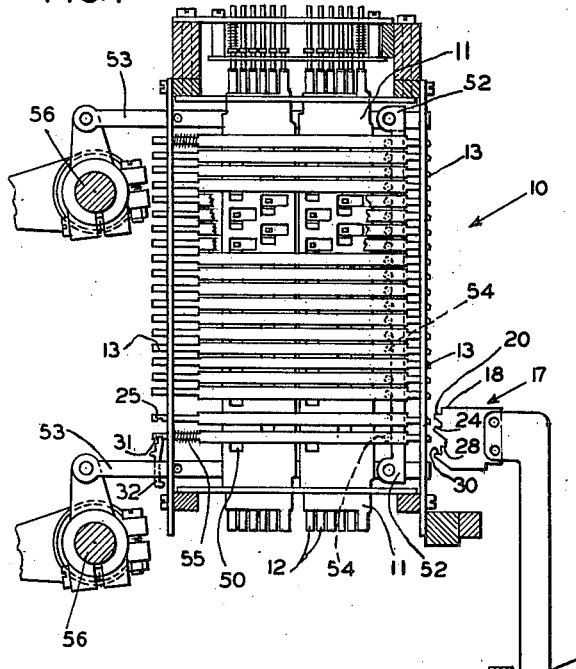
FIG. 7
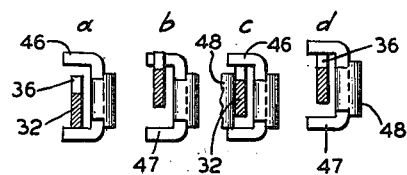
FIG. 8
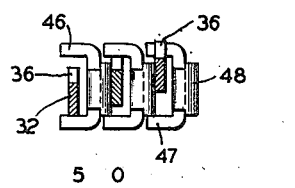
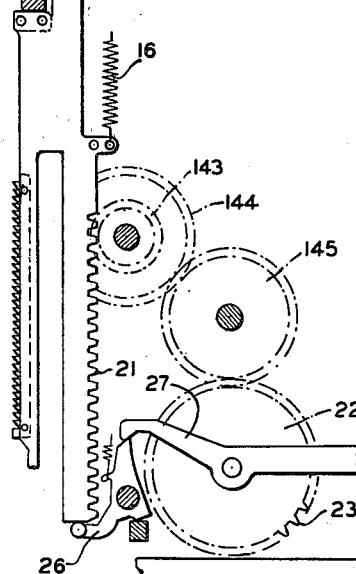
INVENTOR
BRADLEY HASKINS
BY John L. Sterling
ATTORNEY May 27, 1947.  B. HASKINS  2,421,060
TABULATOR
Filed March 27, 1943  3 Sheets-Sheet 2
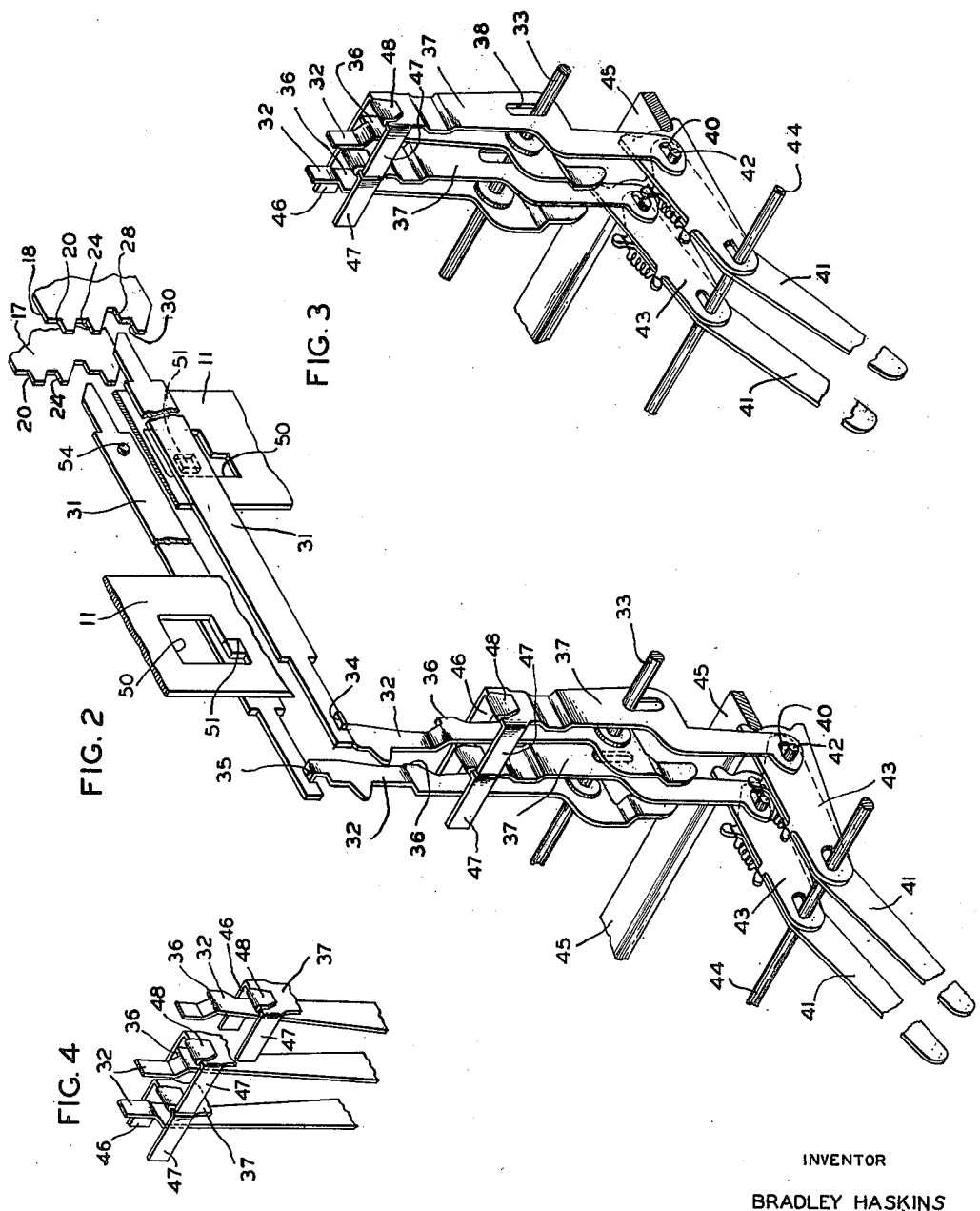
INVENTOR
BRADLEY HASKINS
BY John L. Sterling
ATTORNEY May 27, 1947.     B. HASKINS     2,421,060
TABULATOR
Filed March 27, 1943     3 Sheets-Sheet 3
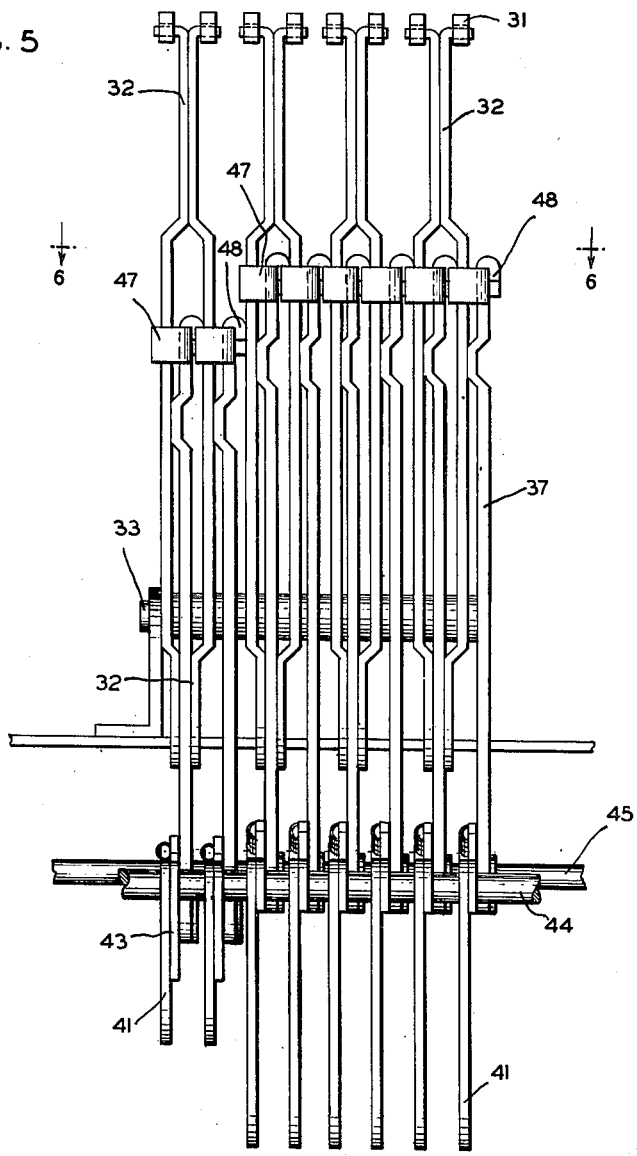
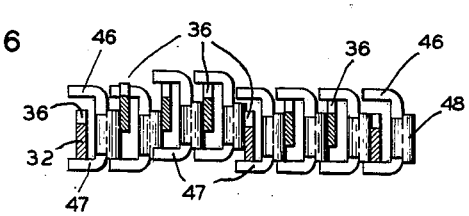
INVENTOR
BRADLEY HASKINS
BY John L. Sterling
ATTORNEY Patented May 27, 1947

2,421,060

UNITED STATES PATENT OFFICE 2,421,060

TABULATOR

Bradley Haskins, Brooklyn, N. Y., assignor to Remington Rand Inc., Buffalo, N. Y., a corporation of Delaware Application March 27, 1943, Serial No. 480,731

7 Claims. (Cl. 101—93)

This invention relates to new and useful improvements in the control of the movement of elements in a machine in which these elements are normally controlled by the setting of permutation code bars. Such a machine may be one in which coded perforations in punched cards are interpreted and printed on the card.

A main object of the invention is to provide a device by means of which the elements may be easily and quickly controlled and limited in their movement, and the movement of one element is caused to control the movement of adjacent bars.

A further object of the invention is to provide a series of limiting devices associated with a set of controllable stops wherein the position of one limiting device will determine the movement of the stop it controls, and the movement of the other stops will be determined by the relation of the first limiting device to the remaining limiting devices associated with the remaining controllable stops.

With respect to the particular form of machine shown, in the drawings, another object is to arrive at a zero printing control in a simple and easy manner, in which a minimum of effort is expended and in which a minimum number of parts have to be operated.

Yet another object of the invention is to secure convenient setting of the control unit, whereby the control levers are mounted at the front of the machine within easy reach of the operator.

Still a further object is to secure the desired control of the machine without changing the operating cycle thereof, nor increasing the time required to perform a normal operation, such as sensing and printing punched card data.

Other objects and structural details of the invention will be apparent from the following description when read in connection with the accompanying drawing, which illustrates merely one form of machine to which the invention may be practically applied.

Briefly and generally considered the invention concerns a machine in which there is a set or series of adjacently disposed slide bars, the movements of each of which are controlled by a set of permutation or code bars to permit free movement of said slide bars or to inhibit the movement of said bars. Associated with each slide bar of the series is a control or limiting device which, when in inoperative position, does not limit the movement of the bar, but which, when in the operative position, will limit the movement of the slide bar to a half of the normal movement. The limiting devices themselves are capable of movement, depending upon the relative position of adjacent related limiting devices.

In reference to the particular form of the invention shown in the drawing, it may be said that zero print control mechanisms are generally used to control the hammer action in adding and listing machines. Ordinarily, this is accomplished by interrupting or suspending the cooperative action between elements of the printing mechanism. The usual form of printing mechanism for these machines includes a plurality of hammers which are normally retracted against spring pressure by latches which hold them back, and are adapted to trip one another for the purpose of printing zeros to the right of a significant digit or character. These machines generally do not have zero keys and the zero type bars are brought automatically to the printing position in all orders in which there is no other digit or character entered. In any order to the right of a printed significant figure, the zeros are printed as a result of the successive tripping of the hammer latches.

The present invention differs from the prior art in reference to the particular form of machine shown in the drawing, in that the zero print control does not control the printing hammers, but is used to control parts of the decoding mechanism which translates the coded data in a punched data card into any one of thirty-six characters. Also, the interpreter has the equivalent of keys, since there is a coded representation which may be punched in the card to represent a zero and there is a zero on the type wheel.

The present invention as applied to the particular type of machine shown resides in a decoding mechanism in which a series of limiting devices are applied to stop bars similar to the stop bars used to select letters or figures for the printing mechanism. The zero control stop, which is the particular one to which the limiting devices are connected, has three positions, a disabled position in which it has no effect in the selection of a printing character, a zero position which results in a zero being printed, and a blank position which prevents any character from being printed.

The present preferred form which the invention may assume and which represents only one preferred embodiment thereof, is shown in the drawing, in which Fig. 1 is a detail cross sectional view taken through the center of a printing interpreter and shows the decoding unit, the rack bar, and some of the associated mechanisms;

Fig. 2 is an exploded isometric view of the zero print control mechanism in the ineffective position;

Fig. 3 is a view similar to Fig. 2, except that the control mechanism is in the effective position and parts of the mechanism are omitted;

Fig. 4 is a perspective of part of the control mechanism showing three orders with the control devices effective for the first two orders and ineffective for the third order;

Fig. 5 is a detail front elevational view of the print control unit;

Fig. 6 is a cross sectional view of the control units shown in Fig. 5 and taken along the line 6—6 of Fig. 5;

Fig. 7 shows the different positions into which the controlled levers may be moved depending upon the position of the limiting devices; and Fig. 8 is a horizontal cross section of the members in Fig. 4.

In view of the fact that the decoding mechanism is disclosed and described in detail in patent to William W. Lasker, Jr., executor, and John Mueller, No. 2,232,816, issued July 6, 1943, and the printing interpreter described in patent to Robert W. Ritzert, No. 2,311,471, issued February 16, 1943, only those parts necessary for an understanding of the present invention will now be described.

The previously mentioned patent to Ritzert, 2,311,471, describes the cyclic operation of the various machine components. The data card is first sensed and a setting of the permutation bars 11 is effected. During this time the stop bars 13, 25, and 31 are held in their initial position, as shown (Fig. 1) by a vertical bail 52 engaging a plurality of extruded lugs 54. Shortly after the permutation bars have been positioned bail 52 is moved to the right (Fig. 1) through links 53 by the rocking of shafts 56 and a series of springs 55 (one for each slide bar) moves the selected stop to its rearward position. Then bail 15 is raised and the rack 14 moves with it until stopped by the selected stop engaging an indented heel 17. When bail 15 is in its highest position, the printing operation takes place, after which bail 15 is lowered, engaging and normalizing all the racks 14. Just before the return of the bail 15, the vertical bail 52 is pulled toward the front of the machine, thereby returning all the stops 13, 25 and 31 to their initial positions. The lowering of the bail 15 brings down all the racks 14 to their original positions and ends the cycle of operation. The operating cams which control the above sequences of operation are fully described in the previously mentioned patent to Ritzert, 2,311,471.

The upward movement of the rack 14 rotates a print wheel 22 through a train of gears 143, 144, and 145. The print wheel has a series of thirty-six type characters 23 on the periphery thereof. When the rack bar 14 does not move, a locking lever 26 for the print wheel is held in the position indicated in Fig. 1, whereby said lever blocks the printing action by holding an arm 27 of the printing mechanism by which the printing wheel 22 is supported in a position in which the type 23 cannot print.

With reference to the specific form of decoding unit in use in the machine, the drawings show such a unit indicated as 10, comprising a plurality of permutation bars 11 with base portions 12, which portions cooperate with latchable interponents (not shown) which may be moved or controlled by any of the usual controls found in data card machinery, or described in the above application. A sensing head with a sensing chamber and a system of latches is employed in the printing interpreter which uses the instant print control, but any other translating system could be used instead. As long as the coded data is transferred to the permutation bars 11 in the form of selected bar movements, the printing and printing control units may be adjusted to function properly.

As a result of the selective movement of one or more of the permutation bars, one of a series of stop bars 13 is released for movement to the rear of the machine (right in Fig. 1). After the stop 13 has been set, a printing control rack 14 is allowed to move upwardly by elevating a bail 15 which is controlled by suitable actuating mechanisms at the side of the machine. A long helical spring 16 furnishes the tension necessary to lift the rack 14. At the upper end of the rack, the indented heel 17 is secured in such manner as to limit against the stop bars 13 when they have been released to effective position. There are two positions which each stop bar 13 may take when released by the permutation bars 11. A full movement results in a displacement which will arrest the rack bar 14 by limiting against the topmost edge 18 of the heel 17, while a half movement of the bar 13 results in a displacement which stops the rack bar 14 by contact with the step portion 20 of the heel 17.

In addition to the two topmost steps or shoulders 18 and 20, the heel 17 of the rack bar 14 is provided with two other indentations, giving three more stop positions. A notch 24 is designed for the exclusive cooperation of a stop bar 25 which is used to lock out the column against any printing action, regardless of the data sensed therein. The lock out mechanism is pre-set by the operator by means of a lever (not shown) which moves the rear end of the stop bar 25 into the knot 24 and holds the heel 17 and the rack bar 14 in their initial position.

Directly below the notch 24 is a double notch with an upper full length step 28 and a lower half length step 30. A zero stop 31 cooperates with this double notch to produce the zero print control action. The mechanism described above is necessary for the printing control of one column only, and must be repeated for each printing position. For example, when the Powers ninety column card is run through the printing interpreter, forty-five characters may be printed at one time, hence, there must be a total of forty-five of the above described mechanisms.

In accordance with the invention each of the zero stops 31 has associated therewith a limiting device having an operative and an inoperative position. There are forty-five of these devices, one of which will now be described in detail.

It is well to bear in mind at the beginning that the following general conditions exist in this device, namely, (1) when all the limiting devices are in their inoperative or "down" position, then blank spaces will occur after each printed character whether it is a letter or a number; (2) when all the limiting devices are in their operative or "up" position, then a zero is printed after each character; (3) when it is desired to print zeros after a number or a significant digit, then the limiting device in the order in which the digit is to occur and the limiting devices, in the orders to the right thereof in number corresponding to the number of zeros desired, are raised to the "up"

or operative position; (4) when it is desired to have a blank space after a character which is printed, then it is necessary that the orders, to the right, or the order in which the character is to be printed, be lowered to their "down" or inoperative position in number corresponding to the number of blank spaces required. How these conditions and settings are achieved and in what detail constructional manner will be apparent in view of the following detailed description of the construction and operation of the limiting or control devices themselves.

The details of the control or limiting devices for zero printing are shown in Figs. 2, 3, 4, 5, 6, 7, and 8. Broadly speaking, these control units aim to determine the movement of the stop bars 31. Under certain conditions these bars are permitted to make a full stroke movement, and under certain other conditions they are permitted to make only a half stroke movement for purposes and reasons later to be made clear. These stop bars 31 are connected to rockable levers 32, mounted on a shaft 33. At the upper end of each lever 32 a turn-over portion 34 engages a slot 35 in the stop bar 31, so that the position of the stop 31 may be controlled and determined by the position of the rockable lever 32. In the middle of the lever 32 is an ear 36 which is adapted to cooperate with a limiting device.

This limiting device is in the form of a control lever 37 guided by the shaft 33 by means of a slot 38, so that it may be moved vertically and set at either one of two positions. At its lower end, the control lever 37 is provided with a slot 40 which cooperates with a pin 42 disposed in the end of a manually operable lever 41. The slot 40 permits the lever 37 to be rocked about shaft 33 whether it is in its upper or lower position. The levers 41 are pivoted on a cross bar 44 and extend far enough toward the front of the machine so that they may be easily operated manually. The levers 37 are resiliently maintained in either of two operating positions by means of a detent plate 43 pressing against a bail plate 45.

At the upper end of each control lever there are two spaced limiting elements or arms 46 and 47 forming, with the upper end of the lever 37, a sort of U-shaped limiting frame. The arms 46 and 47 lie, respectively, in front and to the rear of the lever 32, whether in the inoperative or the operative position of the levers 37. These limiting frames are each provided with an ear 48 which, when adjacent frames are disposed in the same positions, lie in the gap formed between the ends of the arms 46 and 47 for a purpose later to be described. From a consideration of Figs. 2 and 3, it will be apparent, when the levers 37 are in their lowered position, that the levers 32 are free to move an uninterrupted distance or full stroke, but, when the levers 37 are in their elevated operative position, as shown in Fig. 3, that the levers 32 can only move a half stroke distance within the U-shaped limiting frames.

The settable members, such as the stop bars 31 normally tend to make a full stroke movement and they are controlled by a series of permutation bars, such as 11, the setting of which will either permit the members to normally have a full stroke movement or to have no movement at all. In order to further control the movement of the stop bars 31, there has been provided a series of limiting or controlling devices, the setting of which achieves further limitations on the movement of the stop bars. In the inoperative position of these limiting devices the stop bars are under the complete control of the permutation bars and may have a complete full stroke movement or no movement at all, depending upon the setting of the permutation bars 11.

It is desirable here to turn to a consideration of $a$, $b$, $c$, and $d$ in Fig. 7. This figure illustrates four possible relative positions of the levers 32 and the limiting arms 46 and 47. At $a$ in Fig. 7, the lever 37 and arms 46 and 47 are assumed to be in their lowered position with the lever 32 shown therebetween in normal retracted position. At $b$ in Fig. 7 the arms 46 and 47 are still lowered and the lever 32 is shown moved rearward a full step which movement results, as later exlained, in preventing printing or giving a blank space in this order. At $c$ in Fig. 7, the arms 46 and 47 are in their elevated position and the lever 37 is blocked from movement rearward by the engagement of arm 47 in this order with the lug 48 of the arm 37 of the next higher order. This blocking will only permit the lever 32 to be moved rearward a half step. At $d$ in Fig. 7 the arms 46 and 47 are still elevated, but are not held by the adjacent order and the lever 32 has been moved a half step within the frame into contact with arm 46 and, due to the fact that the lever 37 is not blocked, the arm 32 is permitted to continue to move a second half step, so that the resultant movement of the lever 32 has amounted to a full step or movement thereof. At $c$ in Fig. 7 a printing of a zero results, whereas at $d$ in Fig. 7 a blank space will result, the one on account of the half step movement of the lever 32 and the other on account of the full step movement thereof.

In reference to the practical form of the invention shown in Fig. 2, it will be seen that the levers 41 are in their normal or inoperative position and, consequently, the limiting levers 37 are in their lowered position, under which circumstances the levers 32 are free to rock the maximum amount as determined by the freedom accorded to bar 31 by the permutation code bars 11.

It is, of course, understood that the movement of each bar 31 depends upon the position of the permutation bars 11. Each columnar position contains six bars 11 and all have identical openings 50 at their lower extremity. Lugs 51 on the stops 31 cooperate with the openings 50, as shown in Fig. 2, in such manner as to retain the stop bar 31 in its restrained position if any one of the permutation bars 11 are elevated. The raising of any bar 11 indicates that a character has been sensed in the card and, therefore, the zero print control must be disabled for that columnar position. If none of the bars 11 have been elevated, the stops 31 are free to move a full amount or a full stroke to engage the notch 28, thereby holding the rack 14 in its original or normal position in which position no printing occurs.

Fig. 3 shows the limiting devices in their operative positions, in which instance the limiting frames formed by the arms 46 and 47 are disposed in the same plane with each other and with the ears 36 on the levers 32. This elevation of the levers 37 to their operative position is achieved by depressing levers 41, thus rocking the detent plates 43 into new holding position with bail 45.

When the limiting devices are raised to their operative positions, as shown in Fig. 3, it will be observed that the movement of the lever 32 within the arms 46 and 47 is limited to a half step movement, unless the levers 37 are permitted to move. This sort of half step movement is indicated at c in Fig. 7. If any lever 37 is inhibited against movement by reason of the locking of its associated stop 31 by the permutation bars 11, then it is apparent that the elevated limiting frames associated therewith, and defined by arms 46 and 47, will be inhibited because, as shown in Fig. 3, the front edge of the lever 32 lies close against the arm 47. Since the arm 32 cannot move, therefore, the lever 37 of which arms 46 and 47 are a part cannot move. In this instance, therefore, a character is printed in that column.

However, let us consider the situation where the limiting lever 37 is elevated and the lever 32 is not inhibited against movement, and the lever 37 is not inhibited against rocking movement. In this case when the bail bars 52 are released the stop bars 31 tend to move rearward and the levers 32 are rocked about their shaft 33. They will move within the scope of arms 46 and 47 until the rear edge of the levers 32 engages the arm 46. When this contact occurs the further movement of the levers 32 will then swing the levers 37 about their axes, which movement will be permitted by reason of slots 40 and thus the frames themselves will rock and allow the levers 32 to make another half step movement, so that the net result in this case will be a full stroke movement of the levers 32, and the end of the stop 31 associated therewith will be projected fully to engage the shoulder 28 on the rack heel 17. This engagement, as previously stated, will prevent the rack 14 from rising and prevent printing and, therefore, in this column there will occur a blank.

With particular reference to Fig. 2, let us consider the case where the right hand limiting lever 37 has been elevated to an operative position, and the next adjacent lever 37 to the left thereof has also been elevated and has been inhibited from movement by the positioning of code bar 11 to cause the right hand printing of a character. In this case the right hand lever 37 or limiting device under consideration being elevated will allow a half stroke movement to its enclosed lever 32, but will prevent any further movement, since the next left adjacent limiting device has the ear 48 thereon in the path of the arm 47 of the right hand limiting device under consideration. In view of the fact that the next adjacent lever 32 to the left is held from movement by the lug 51 in slot 50 of the elevated bar 11, this will prevent the movement of the right hand limiting device under consideration. Under these circumstances then in the particular order considered, the lever 32 will have a half stroke movement, thus permitting the end of stop 31 to project and engage the shoulder 30 of the rack heel 17 and thus permit the rack 14 to move up far enough to position the print wheel at zero.

Referring again to Fig. 2, let us next consider the case where the right hand lever 37 is elevated and the next adjacent lever 37 to the left has also been elevated and has moved rearward a half step. Under these conditions the lever 32 in the right hand order under consideration will be permitted an initial half stroke movement and then the lever 37 itself will be picked up and swung rearward a half stroke until the arm 47 thereon abuts the lug 48 of the next adjacent limiting device, whereupon further movement of the right hand limiting device in question is prohibited. This will permit a full stroke movement of the lever 32 and stop bar 31 associated therewith, thus preventing the rack 14 from rising, and, therefore, a blank will occur in this order.

Let us now consider a specific problem as set forth in Figs. 5 and 6. In this problem it is desired to print a character in the first order followed by three blank columns, then to print a numeral followed by two zeros and then another numeral is to be printed. In Figs. 5 and 6, in which this problem is structurally applied, it will be noticed that the first two limiting devices 37 are disposed in their down or inoperative positions, while the remaining devices are set in their up or operative positions. Let it be assumed that a card is sensed in which the corresponding columnar positions contain the character A, followed by three blank columns, the number 5, then two blank columns and the number 2. In the drawing these characters on the card are indicated directly below the zero control units shown in Fig. 6.

In the first column, the lever 32 (see Fig. 6) will not move because the sensing of character A will raise at least one of the permutation bars 11 and lock the bar 31 by the engagement of the lug 51 with the limiting portion of the opening 50. In the second order, the lever 32 is free to rock a full stroke to the rear, so that the end of the stop 31 enters the notch 28 and there is no movement of rack 14 and, therefore, no character will be printed. The full movement of stop 31 in this column is made possible because no permutation bars 11 have been raised and because limiting lever 37 associated therewith is still in its lower inoperative position, and not set to limit the movement of the lever 32.

The limiting device in the third order or column is set in its active or operative position and the ear 36 of the lever 32 is in position to have its movement limited by the arms 46 and 47. However, it is to be noted that in this instance, the lever 32 moves a half step to the rear before it meets the arm 46. When it so meets the arm 46, it is then possible for the arm 46 to move to the rear, since the arm 47 will pass in a plane above the adjacent lug 48 of the adjacent limiting device to the left, thus permitting a full stroke movement of arm 32 and its associated stop 31. Because of this the rack 14 will be locked down and a blank will result in the third position or column.

The fourth order or column will produce a blank in the following manner: the lever 32 is allowed to move rearward a half step until it meets arm 46 of its limiting device. Since no character was printed in the preceding column, the lever 37 with its associated lug 48 is moved rearward and this will permit the limiting device in the instant order to be moved a half step, so that the net result is the advance of the lever 32 a full step. This movement is stopped when the arm 47 of the device meets the lug 48 of the next left adjacent device.

The fifth order or column will be retained in the nonprinting position in the same manner as the first unit, because the character or numeral 5 is sensed and the lever 32 related thereto is inhibited from any movement by the lug 51 and opening 50 and, therefore, the stop bar 31 in this order cannot move.

With regard to the sixth and seventh columns, these limiting devices are prevented from moving because the limiting device of the fifth column is inhibited and, consequently, the arms 47 of the sixth and seventh columns will be barred by the lugs 48 on the fifth and sixth columns, since they are all disposed in their upper positions, as will be apparent from an examination of Fig. 5. Consequently, in these sixth and seventh columns the levers 32 are allowed to make only a half step into contact with arm 47 and, consequently, the stop bars 31 in these columns will stop the rack 14 in a position which will permit the printing of a zero in these columns.

The eighth or last columnar unit will be locked in the same manner as the first and fifth units, since a numeral is sensed there. The characters as printed on the card are indicated in the second row of figures below Fig. 6. After the printing operation, the vertical bail 52 is drawn toward the front of the machine and the stop 31, together with the zero control units, are returned to their original positions.

Referring now to Figs. 4 and 8, the first figure is a perspective view of a series of limiting devices in which the first two devices are in their elevated positions and the third device is in its lowered position. It will be assumed that in the first position a numeral such as 5 (see Fig. 8) is sensed in which case the lever 32 and the limiting device itself will be held in their initial positions as before described. In the second order of this problem the limiting device is up and, therefore, effective and its movement will be prohibited by the engagement of its arm 47 with the lug 48 on the device of the first order. Consequently, the lever 32 in the second order can move only a half step between the limits of its arms 46 and 47 and the result will be the printing of a zero. In the third order of this problem the limiting device is down as shown in Fig. 4, and we will assume that it is desired that no character be printed. Consequently, the lever 32 in this order will move a full step to the rear when released by the bail 52, since the limiting device which ordinarily would limit it, is in a lowered position, in which position the arm 46 is not in the path of lug 48 on the adjacent lever 37, and is not in any way limited in its rearward movement. Therefore, in the third order the stop 31 will move rearward a full distance and will cause a blank to result in this position. In Fig. 8 a cross section of this problem is shown with the parts in their operated position. In the first order the lever 32 is back in its normal position and a character is printed as stated; in the second order the lever 32 is allowed to make a half step movement which will result in the printing of a zero; and in the third order the lever 32 has been allowed to move a full step and thus a blank space will result in this order.

It will be obvious that the printing of a zero which is not sensed can be accomplished in this mechanism only when the control or limiting devices are set in their active or operative elevated positions and when a character precedes the denominational order in which the zero printing is to be effected.

The number of zero control units which may be set up in this manner is dependent only upon the total number of printing orders which in this case, happens to be forty-five. Since these machines are arranged to print letters as well as figures, the zero control units are placed in their effective positions only in columns where figures are to be printed. As stated before in substance, if a character is printed in the fifth column and zeros are desired to be printed in the following three columns, then the limiting devices for the fifth, sixth, seventh, and eighth columns are moved to their elevated positions and zeros will be printed as above set forth. In accordance with the structure set forth in Fig. 4, if zeros have been printed in a series of columns and it is desired to have a blank in the column or columns after said series, all that is necessary is to lower the limiting devices in these subsequent columns and blanks will occur.

To recapitulate generally, the invention concerns the control of a plurality of settable devices, such as stop bars, the movement and setting of which is effective to determine the actuation of other elements of the apparatus with which the settable devices are associated. In one instance this apparatus may be a printing interpreter for punched data cards, the specific form of embodiment of the invention which has been set forth in the drawing.

When the limiting devices have been set in what has been called their elevated or operative positions three conditions arise as follows:

(1) If the permutation bars 11 have been set to limit the movement of the stops, then the stops and cooperatively disposed limiting devices are both inhibited from movements; (2) if the permutation bars do not inhibit the movement of the stops, then the operatively disposed limiting devices will limit the movement of the stops to a half stroke if the limiting device itself is inhibited from movements; and (3) similarly to condition (2), if the limiting devices are not inhibited from further movement then the stops are permitted a full stroke movement.

Whether or not the limiting devices of one order are allowed to have any extra or further movement, after being disposed in their operative position, depends upon the relation of that particular limiting device to the position of the one immediately adjacent thereto to the left. In the particular form of the structure shown this immediately adjacent controlling device would be the one next to the left of the device under consideration.

Therefore, it is clear that the movement of any stop depends upon the position of its limiting device with respect thereto. It is also clear that the movement of any stop will also depend upon the relation of the position of its limiting device with respect to that of an immediately adjacent order.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the character described, the combination of a series of differentially settable members, a stop for each of said members, a set of selectively actuable control elements associated with each of said stops whereby a stop is rendered ineffective upon actuation of any one of its associated set of elements, and means for selectively controlling the movement of said stops whereby inhibition of motion of one stop by its associated set of elements permits partial movement of all stops in the lower orders.

2. In a machine of the character described, the combination of a series of differentially settable members to be arrested in a plurality of positions, a series of stops each settable from normal ineffective position to either of two positions to arrest said members, a set of selectively actuable control elements associated with each of said stops whereby a stop is retained in normal ineffective positon upon actuation of any of its associated set of elements, and means for selectively controlling the movement of said stops whereby inhibition of motion of one stop by its associated element permits all stops in the lower orders to move to one of said two positions.

3. In a machine of the character described, the combination of a series of differentially settable members to be arrested in a plurality of positions, a series of stops each settable from normal ineffective position to either of two positions to arrest said members, a set of selectively actuable control elements associated with each of said stops whereby a stop is retained in normal ineffective position upon actuation of any of its associated set of elements, and means for selectively controlling the movement of said stops whereby inhibition of motion of one stop by its associated elements permits only half step movement of all stops in the lower orders.

4. In a machine of the character described, the combination of a series of differentially settable members, a series of sets of stops, one set for each of said members, a series of sets of selectively actuable elements for controlling the movement of said stops, an additional stop for each of said members, each of said additional stops being controlled by its associated set of actuable elements whereby said additional stop is rendered ineffective upon actuation of any one of its associated set of elements, and means for selectively controlling the movement of said additional stops whereby inhibition of motion of one stop by its associated set of actuable elements permits partial movement of all stops in the lower orders.

5. In a machine of the character described, the combination of a series of differentially settable elements for controlling printing, a series of sets of stops for arresting said settable elements in a plurality of printing positions, a series of sets of permutation bar mechanisms for controlling the movement of said stops, an additional series of stops each settable from normal ineffective position a half step to arrest its associated settable elements in zero printing position and a full step to arrest its associated settable elements in a position to prevent printing, each of said additional stops being controlled by an associated set of said permutation bar mechanisms whereby a stop is retained in normal ineffective position upon actuation of any one of its associated set of bar mechanisms, and settable means adapted when set for selectively controlling the movement of said additional stops whereby inhibition of motion of any one of said additional stops by any one of its associated set of bar mechanisms permits half step movement of all the stops of the next lower orders.

6. In a machine of the character described, the combination of a series of differentially settable racks for controlling printing, a series of sets of stops for arresting said settable racks in a plurality of printing positions, a series of sets of permutation bar mechanisms for controlling the movement of said stops, an additional series of stops under control of said permutation bar mechanisms whereby any one of said additional stops is moved from normal non-arresting position a full step to arrest its associated rack in a position to prevent printing when the whole set of its associated bar mechanisms is not actuated and whereby a stop is retained in normal non-arresting position upon actuation of any one permutation bar mechanism of its associated set, and settable means adapted when set for selectively controlling the movement of said additional stops whereby inhibition of motion of one stop by its associated bar mechanisms permits only half step movement of all the stops of the next lower orders to arrest their associated racks in zero printing position.

7. In a machine of the character described, the combination of a series of differentially settable members to be arrested in a plurality of positions, a series of stops each settable from normal ineffective position to either of two positions to arrest said members, a set of selectively actuable control elements associated with each of said stops whereby a stop is retained in normal ineffective position upon actuation of any of its associated set of elements, and means for selectively controlling the movement of said stops whereby inhibition of motion of one stop by its associated elements permits a half step movement only of all stops in the lower orders, said selectively controlling means including, a lever coupled to each of said stops and movable therewith, a restricting device for each of said levers, each of said restricting devices being settable into cooperative relation with its associated lever, a first restricting portion on each of said restricting devices for preventing movement of said restricting device when its associated stop is in its retained position, a second restricting portion on each of said restricting devices adapted to cooperate with said first restricting portion on the restricting device of the next lower order for preventing movement of said restricting device of the next lower order provided both said restricting devices are in their set position, and a third restricting portion on each of said restricting devices for limiting the movement of its associated lever and thereby of its associated stop to half step only when said restricting device is prevented from movement by the restricting device of the next higher order provided both said restricting devices are in their set position.

BRADLEY HASKINS.

REFERENCES CITED

The following references are of record in the file of this patent:

UNITED STATES PATENTS

| Number | Name | Date |
|---|---|---|
| 1,946,915 | Peirce | Feb. 13, 1934 |
| 2,185,260 | Lasker | Jan. 2, 1940 |
| 1,946,900 | Daly | Feb. 13, 1934 |
| 2,150,218 | Gray | Mar. 14, 1939 |
| 2,323,825 | Maschmeyer | July 6, 1943 |